United States Patent [19]
Curry et al.

[11] 3,956,517
[45] May 11, 1976

[54] METHOD OF FORMING RIPPLED CHIP-TYPE PRODUCTS

[75] Inventors: Alan Dale Curry, Colerain Township, Hamilton County; Leon Levine, Cincinnati; Dennis William Rose, Colerain Township, Hamilton County, all of Ohio

[73] Assignee: The Procter & Gamble Company, Cincinnati, Ohio

[22] Filed: May 13, 1974

[21] Appl. No.: 469,268

[52] U.S. Cl................................... 426/502; 99/349; 99/353; 425/223; 425/324 R; 426/144; 426/438; 426/517; 426/560; 426/808
[51] Int. Cl.².................. A21C 11/04; A21D 8/08; A23L 1/216
[58] Field of Search ........... 426/144, 145, 502, 517, 426/438, 441, 808, 560, 346; 425/336, 363, 369, 223, 324 R, 294; 99/353, 349, 352

[56] References Cited
UNITED STATES PATENTS

| | | | |
|---|---|---|---|
| 1,720,097 | 7/1929 | Scholz | 425/294 |
| 2,769,714 | 11/1956 | Stahmer | 426/144 |
| 2,823,625 | 2/1958 | Oakes | 426/502 |
| 3,027,258 | 3/1962 | Markakis et al. | 426/441 X |
| 3,512,990 | 2/1967 | Slaybaugh | 426/502 X |
| 3,539,356 | 11/1970 | Benson et al. | 426/808 X |

FOREIGN PATENTS OR APPLICATIONS

| | | | |
|---|---|---|---|
| 1,331,042 | 9/1973 | United Kingdom | 426/502 |
| 985,808 | 3/1965 | United Kingdom | 426/441 |
| 608,996 | 9/1948 | United Kingdom | 426/441 |

OTHER PUBLICATIONS

Webster's New World Dictionary; p. 319 Editor, Guralnik; The World Publishing Company; New York 1968.

*Primary Examiner*—S. Leon Bashore
*Assistant Examiner*—M. Steve Alvo
*Attorney, Agent, or Firm*—Lawrence J. Klich; Louis G. Xiarhos

[57] ABSTRACT

A process for producing uniformly shaped chip-type products having a surface design thereon. The process provides chip-type products having a series of substantially parallel alternate arcuate ridges and grooves extending across both surfaces which effect a rippled appearance to the products wherein the rippled configuration is impressed only on one surface of the dough by a mill roll having an annularly grooved surface.

15 Claims, 2 Drawing Figures

METHOD OF FORMING RIPPLED CHIP-TYPE PRODUCTS

BACKGROUND OF THE INVENTION

The present invention relates to a food processing method and more particularly to a method for producing uniformly shaped rippled chip-type products from a formulated dough sheet. Since the food product is formed from a dough sheet, the chip-type products may be formulated from a variety of farinaceous or proteinaceous materials to produce gustatory delights appealing to a wide range of palates. The preferred chip-type products, however, are formulated from potato dough sheets to produce unique, uniformly shaped potato chips.

Relatively recent technical innovations in the food processing art have given the consumer a superior chip-type alternative to conventional potato chips made from slices of raw potatoes. These innovations have produced chip-type food products which have a uniform color, texture and shape. For example, commonly-assigned copending patent application of Liepa, Ser. No. 62,175, filed Aug. 7, 1970, and entitled "Potato Chip Products and Process for Making Same," incorporated herein by reference, discloses a process for preparing formulated potato chips which comprises mixing dehydrated cooked potatoes with water to form a dough, forming the dough into shaped pieces, and frying the pieces until they are crisp.

The above-mentioned Liepa process may be used advantageously in conjunction with the apparatus and methods of MacKendrick, U.S. Pat. No. 3,520,248, issued July 14, 1970, and entitled "Chip Frying Machine;" Liepa, U.S. Pat. No. 3,576,647, issued Apr. 27, 1971, entitled "Preparation of Chip-Type Produt;" Liepa, U.S. Pat. No. 3,608,474, issued Sept. 28, 1971, entitled "Apparatus for Preparing Chip-Type Produts;" and Liepa, U.S. Pat. No. 3,626,466, issued Dec. 7, 1971, entitled "Molding Device for Preparing Chip-type Produts," all four patents incorporated herein by reference in their entireties, to prepare uniformly shaped chip-type products by employing a plurality of shaped, mating mold members which shape a dough section during frying. These patents disclose that the mating mold members may be of any desired shape, depending upon the desired shape of the final product.

However, it may not be desirable to use these methods for the preparation of chip-type food products having rippled surfaces, for brevity, hereinafter referred to as "rippled chips." Specifically, rippled mating mold members such as are contemplated in the above-mentioned MacKendrick or Liepa apparatus patents tend to be expensive and difficult to maintain. Thus, alternate methods of forming rippled chips from dough sheets would be desirable.

Another known method for forming rippled chips involves the use of a pair of corrugated rollers to form a dough sheet with rippled surfaces, which rippled dough sheet is then further processed to produce rippled chips. For example, such an apparatus is disclosed in Unilever Ltd., British Pat. No. 1,331,042, published Sept. 19, 1973, and entitled "Production of Foodstuffs" which utilizes a pair of corrugated rollers to impress a rippled configuration on opposing surfaces of raw dough slices.

However, the use of a pair of corrugated mill rolls presents additional processing problems. For instance, it will be appreciated by those skilled in the art that a doctor blade is often used to scrape, or peel, a dough sheet from a roller to insure a clean removal of the sheet from the roller surface. If such a doctor blade is used in attempting to peel a rippled dough sheet from a corrugated mill roll, the doctor blade serves only to cut off the surface ridges, rather than to insure a clean removal of the dough sheet from the roller. Further, if such a rippled dough sheet is used in the practice of any of the above-mentioned MacKendrick or Liepa apparatus patents, additional processing disadvantages result. For example, in a preferred practice of these patents, a partial vacuum suction is used to transfer the individual dough sections from the cutting member to an awaiting shaped mating mold member. It will be appreciated that if this same preferred technique is attempted in transferring dough sections having rippled surfaces, air will readily be sucked in between the ripples so that no partial vacuum will be created sufficient to hold a dough section for transfer. If a higher vacuum is applied to the raw dough sections in an attempt to overcome this problem, then the high vacuum draws the raw dough partially into the holes causing unsightly distortions in the rippled surface. Thus, only a dough section having a smooth surface can be satisfactorily transferred from the cutting member to an awaiting mating mold member using the preferred vacuum technique described in the above-mentioned patents.

Accordingly, it is an object of the present invention to provide a novel process for preparing rippled chip-type products from a formulated dough sheet.

It is a further object of the present invention to produce such rippled chips from a formulated dough sheet by a simple and economic process.

It is also an object of the present invention to provide a process for preparing rippled chip-type products from a formulated dough sheet with improved handling of cut dough pieces.

These and other objects of the present invention will become evident to those skilled in the art from a reading of the present disclosure with the appended claims.

SUMMARY OF THE INVENTION

It has been discovered that rippled chip-type products can be conveniently prepared by passing a dough sheet between a pair of rollers, one of said rollers having a smooth surface and the other having an annularly grooved surface. The gap between said rollers is adjusted so as to impress a corrugated, or rippled configuration on only one surface of the dough sheet, leaving the other surface substantially smooth. The sheet is cut into desired chip-like portions and further processed, as by deep fat frying, to form chip-type products having alternate arcuate ridges and grooves on both surfaces which provides a rippled effect on both sides of the product.

BRIEF DESCRIPTION OF THE DRAWINGS

While the specification concludes with claims particularly pointing out and distinctly claiming the subject matter regarded as forming the present invention, it is believed the invention will be better understood from the following description taken in connection with the accompanying drawings, in which:

While the invention will be described in connection with a preferred embodiment, it will be understood that it is not intended to limit the invention to that embodiment. On the contrary it is intended to cover all alternatives, modifications and equivalents as may be included within the spirit and scope of the invention as defined by the appended claims.

DETAILED DESCRIPTION OF THE INVENTION

Figure 1:
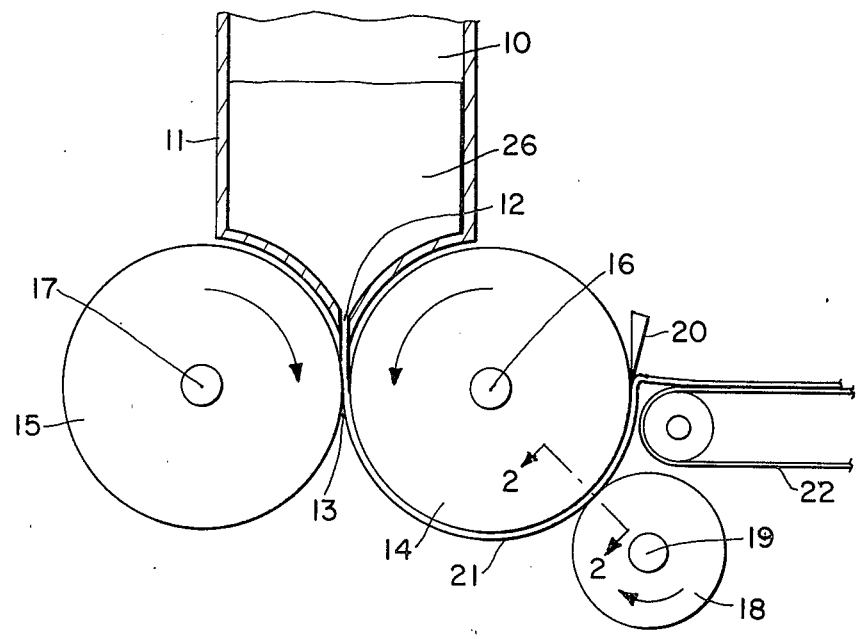
FIG. 1 is a schematic elevational view of a preferred embodiment of the present invention.

Turning first to the drawings, in FIG. 1 there is shown a schematic elevational view of a preferred means for effecting a rippled design on one surface of a dough sheet. A feed hopper is indicated generally at 10 and consists of a convergent wall structure 11 terminating in a feed opening 12. The opening 12 overlies the clearance, or nip, 13 of front mill roll 14 and back mill roll 15, each of which are rotatably mounted on axles 16 and 17, respectively. The mill rolls are contra-rotating, that is, they rotate in the direction of the arrows, in conventional manner and may be driven by any convenient means, not shown. Also, not shown are the mounting bearings for the mill rolls and the means by which the nip between the rolls 14 and 15 may be adjusted. Such expedients are, however, old in the art and are not repeated here to avoid redundance.

In the illustrated embodiment of the present invention, embossing mill roll 18 is rotatably mounted on axle 19 in a longitudinal relationship to front mill roll 14 and rotates in the direction indicated in conventional manner, contra-rotating to front mill roll 14, driven by means not shown. Scraping blade 20, commonly known as a doctor blade, may be positioned in abutting relationship to front mill roll 14 for the purpose of separating the dough sheet 21 from the surface of said mill roll. Conveying means 22 is disposed near to mill roll 14 so as to support and move dough sheet 21 from mill roll 14 after it has been embossed in the method herein disclosed. As best shown in the enlarged fragmentary cross-sectional side view of FIG. 2, the embossing roll 18 has a plurality of annularly disposed grooves generally indicated at 23. Each groove 23 is disposed into the surface a distance $x$ and is spaced apart on the mill roll surface, one from another, a distance $y$. Each groove 23 is a distance $z$ wide at the surface of the embossing roll 18 and consists of converging sides 24 which are disposed at an acute angle $\alpha$ to each other and converge at the groove bottom 25. The bottom 25 may be rounded, peaked, or flat depending on the manner by which the grooves 23 are machined into the embossing mill roll surface.

The material which is to be treated in accordance with the present invention is a formulated dough suitable for sheeting and subsequent deep-fat frying to form chip-type food products. The dough may be formulated from any of a variety of ingredients, such as from farinaceous materials such as potatoes, corn, wheat, rice, oats, or the like, from proteinaceous materials such as soy, peanuts or sunflower seed, or from any delectable combination thereof. The only requirement is that the material must be able to be formed into a coherent workable dough sheet for further processing in accordance with the invention. Other optional ingredients, such as condiments or spices, natural or artificial flavorings, vitamins, emulsifiers, antioxidants, colorants, or the like can be suitably included in the dough base which is treated in accordance with the present invention. The preferred material for treatment in accordance with the present invention is dehydrated potatoes, either granules, flakes, or mixtures thereof. The dough may conveniently be prepared by blending dehydrated potatoes with water, as by mixing in a known manner in a conventional blender or mixer. In the preparation of a formulated potato dough, it is preferred that the moisture content be from about 25% to about 55% of the total dough material. Further details of processing a potato dough may be obtained from the above-mentioned Liepa patent application.

Turning once again to FIG. 1, the dough material 26 is placed in the feed hopper 10. The material is fed downwardly through the hopper opening 12 to be evenly deposited between mill rolls 14 and 15 as they rotate in operation. This operation forms the dough material into a dough sheet 21 which sticks to front mill roll 14. The preferential sticking of the dough sheet 21 to front mill roll 14 rather than to the back mill roll may be effected in any of a number of conventional ways known to the art, such as by employing a speed or temperature differential as between the two mill rolls, or by utilizing a conventional surface treatment on one of the mill rolls. If a speed diferential is employed, back roll mill 15 typically has a peripheral speed of from 5 to 50 percent slower than front mill roll 14, depending on the operating conditions, with a preferable speed differential of from about 10–20 percent slower. If a temperature differential is employed, the back mill roll 15 is kept from 10° to 100°F cooler. This processing condition reflects the basic milling principle that a dough sheet preferentially follows the hotter of two rolls. A temperature differential of from 50° to 65°F between the surface temperatures of the respective rolls is preferred. Surface treatments of one or both rolls are old in the art and may be employed in the practice of the present invention. Any known surface treatment, for instance, coating the back mill roll with a non-stick surface coating, such as Teflon, may be used to great advantage.

Figure 2:
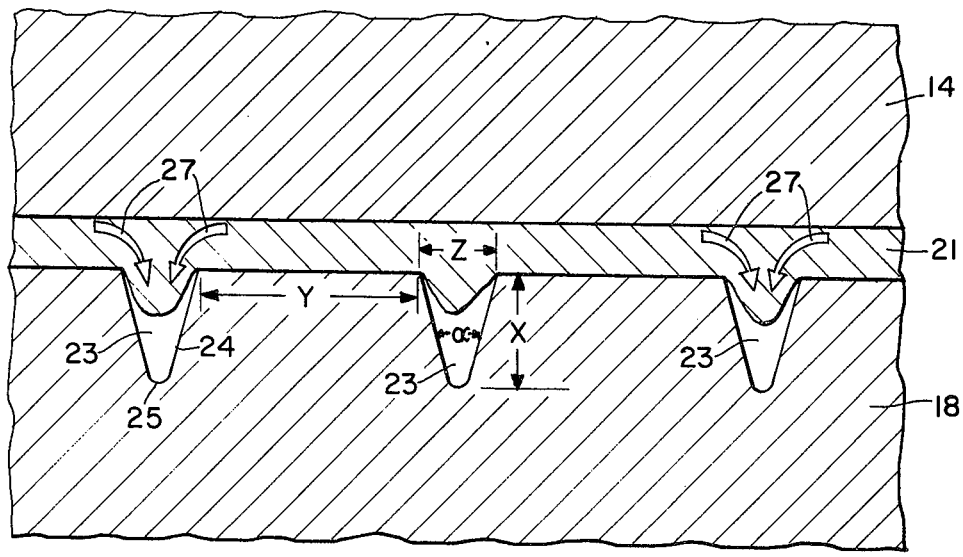
FIG. 2 is an enlarged fragmentary cross-sectional view of a preferred embodiment of the present invention taken along line 2—2 of FIG. 1 showing the interface of a smooth and an annularly grooved roller with a dough sheet therebetween.

The dough sheet 21 sticking to front mill roll 14 is subsequently passed between the nip of front mill roll 14 and embossing roll 18 whereby a rippled, or corrugated, pattern is impressed into one surface of the dough sheet 21. The rippled configuration in the dough sheet surface results from the force applied to dough sheet 21 by embossing roll 18. As best shown in FIG. 2, due to the opposing forces between front mill roll 14 and embossing roll 18, dough sheet 21 tends to flow into the grooves 23, as depicted by the flow pattern arrows 27. After having a rippled configuration impressed into one surface of dough sheet 21, the dough sheet continues around front mill roll 14 until it is removed by doctor blade 20 onto conveying means 22. Conveying means 22 transports dough sheet 21 away from the apparatus as depicted in FIG. 1 for further processing into rippled chip-type products, preferably with the smooth surface dough sheet 21 away from the surface of conveying means 22. Dough sheet 21 may then be advantageously employed in the practice of the aforementioned MacKendrick and Liepa patents in forming chip-type products having two rippled surfaces. Dough sheet 21 may also be further processed in accordance with alternative known methods of forming chip-type products by constrained or known random frying methods, such as those disclosed in Pringle et al., U.S. Pat. No. 2,286,644, issued Jun. 16, 1942, and entitled "Method and Apparatus for Processing Potatoes," or Anderson et. al., U.S. Pat. No. 3,149,978, issued Sept. 22, 1964, entitled "Process for Cooking Corn Dough in the Form of Chips" and assigned to Arthur D. Little, Inc. to obtain rippled chip-type products.

If the dough sheet 21 is further processed in accordance with the aforementioned MacKendrick or Liepa patents, the dough sheet, rippled on one side, is removed from front mill roll 14 so that its rippled surface is facing downward and its smooth surface facing upward as the dough sheet is conveyed along a substantially horizontal conveying means. This then permits the cutters and associated vacuum suction conveying means, as described in the above-mentioned MacKendrick or Liepa apparatus patents, to be utilized without any change in the vaccum pressure from that used for smooth-surfaced dough pieces. After being transferred to awaiting mold members, the dough pieces are constrained between a pair of closely fitting, similarly configured shaping molds while being cooked. If the dough pieces are deep fat fried, the shaping molds preferably have apertures to permit the hot frying fat to come into intimate contact with the dough. Of course, the shaping mold halves are spaced one from another sufficient to permit the development of a distinct rippled effect on both surfaces of the chip. The frying operation can be carried out with the frying fat at a temperature of from about 275° to about 400°F, preferably from about 315°F to about 375°F, with the frying time of from about 5 to about 60 seconds, preferably from about 10 to 25 seconds. Alternately, the dough pieces can be cooked by baking, instead of deep fat frying.

In the operation of the present invention, it is important that the surface design impressed on the dough sheet be substantially parallel alternate arcuate grooves and ridges. If the design impressed onto the dough sheet is other than a rippled design, such as a checkerboard, honeycomb, or other similar pattern, the surface design will not be conveyed to the opposite side of the chip during frying. This difference in design transfer from one surface to both surfaces during cooking is due to dough shrinkage during cooking. With a rippled design, dough shrinkage is restricted along the ridges, due to the dough build-up in the ridges. But shrinkage between the ridges is accentuated, since the dough sheet is thinner and there are no thick dough ridges to restrict shrinkage. However, if the surface design impressed onto the dough sheet consists of a pattern having substantially transverse ridges, shrinkage upon cooking is restricted in both directions, thus inhibiting the conveyance of a distinct design to the opposite surface of the cooked chip. In the practice of the present invention, while both sides of the cooked chips have a distinct rippled effect, the ripples may be slightly more pronounced on the one surface. Chip-type products having a decidedly rippled configuration on both sides can, however, be readily prepared.

In a preferred construction, embossing roll 18 is annularly grooved so as to assure that dough sheet 21 does not stick in the grooves. If embossing roll 18 were longitudinally grooved, portions of dough sheet 21 would tend to stick in the grooves causing either the dough sheet to tear or to stick to embossing roll 18 in preference to front roll mill 14. Of course, in the preferred practice of the present invention, conventional means, such as suggested earlier, may be employed to insure that the dough sheet follows and sticks to the front mill roll in preference to the embossing roll. The grooves, depicted in cross-sectional view in FIG. 2, are preferably machined with inwardly converging sloped sides 24, rather than with parallel sides or with inwardly diverging sloped sides, so as to promote good dough sheet release characteristics after the rippled configuration is impressed into the dough sheet. The angle $\alpha$ together with the distance $x$ define the cross-sectional shape of grooves 23. There is no criticality as to the angle $\alpha$, as long as it is an acute angle thereby insuring that sides 24 are inwardly converging.

The groove depth $x$ into embossing roll 18 is also not critical and may be determined by the extent to which the rippled surface effect is to be predominant in the finished chip-type product. If distance $x$ is too small, little or no rippling effect is realized. Similarly, if distance $x$ is too large in relation to the thickness of dough sheet 21, unsatisfactory product may result due to dough sticking and buildup in the grooves. Excellent results are achieved when $x$ is between about 0.03 to 0.08 inch, and preferably between about 0.04 to 0.07 inch.

The distance $y$ between grooves and groove width $z$ should have a ratio of from about 1:1 to about 3.5:1 A preferred ratio is from about 2:1 to about 3.5:1 to insure that the dough sheet, rippled on one surface, produces chip-type products with two rippled surfaces after further processing and frying. Excellent rippled chips are obtained when $y$ is between about 0.06 to 0.12 inches, and preferably from about 0.08 to about 0.15 inches. In producing final chip-type products with two desirably rippled surfaces, it has further been found that the ratio of the volume of dough sheet 21 forced into grooves 23 to the total volume of dough sheet 21 should be from about 1:2 to about 1:6 and preferably from about 1:2.5 to about 1:4. It will be appreciated that the distances $x$, $y$ and $z$, and the respective ratios of each, can be varied in a number of ways to advantage without departure from the spirit and scope of the present invention. Of course, it will also be evident to those skilled in the art that the dough sheet formed must be able to be fried into crisp chip-type products. Accordingly, the dough sheet should have a thickness of from about 0.005 inch to about 0.1 inch, and preferably from about 0.01 inch to about 0.03 inch. This thickness can be readily achieved in practice by adjustment of the size of the nip between opposing mill rolls 14 and 15 and between front mill roll 14 and embossing roll 18.

In carrying out the present invention, the relative sizes of back mill roll 15 to front mill roll 14, and front mill roll 14 to embossing roll 18 are not critical. Following basic milling procedure, back mill roll 15 and front mill roll 14 are typically substantially equal in size and mass, as is conventional with oppositely disposed, paired mill rolls. In determining the relative size of front mill roll 14 to embossing roll 18, consideration should be given to the factor of the embossing roll 18 having grooves 23 which tend to accentuate any tendency for dough sheet 21 to stick to embossing roll 18 in preference to front mill roll 14. Those skilled in the art will appreciate that this tendency may be minimized by providing embossing roll 18 with a smaller diameter than front mill roll 14, thus effecting less nip contact area. Of course, embossing roll 18 must be of sufficient size to avoid flexing across the roll, as can readily be appreciated.

In accordance with a further aspect of this invention, the rippled dough sheet may be achieved by the use of only two mill rolls instead of three rolls, as illustrated in FIG. 1. In this embodiment, embossing roll 18 is substituted for back mill roll 15 so that dough material 26 is simultaneously sheeted and a rippled design impressed thereon as it is passed between the nip of the two rolls. However, the three-roll design illustrated in FIG. 1 is preferred in the practice of the present invention. In the illustrated embodiment, embossing roll 18 mounted on axle 19 may be retractable to provide for flexibility in processing chip-type products. By retractability, it is meant that the distance between axle 16 and axle 19 be variable, so that embossing roll 18 may or may not contact dough sheet 21 as it passes around front mill roll 14, depending upon the position of embossing roll 18. The means by which such an expedient may be effected are old in the art and are not repeated here to avoid redundance. This expedient may be employed to permit flexibility in processing either flat-surfaced or rippled chip-type products from formulated dough sheets without the necessity of major apparatus changes. This expedient is especially useful in the practice of the above-mentioned MacKendrick or Liepa apparatus patents, since the same paired mating mold members may thus be used in producing either smooth or rippled chips.

The present invention is also concerned with alternative methods of obtaining a formulated dough sheet with one smooth and one rippled surface. For example, the formulated dough sheet may be formed by extrusion and a rippled design subsequently impressed upon one surface by passing the extruded dough sheet between the nip of two mill rolls, one of which is annularly grooved. Also contemplated to be within the scope of the present invention is the use of a suitable die which impresses a rippled effect on one surface of the dough sheet as it is being extruded. This latter expedient provides for the simultaneous extrusion and rippling of the formulated dough sheet.

The following example will serve to illustrate the present invention and is not intended to limit it in any way.

EXAMPLE 1

A formulated potato dough prepared from dehydrated potatoes and water and having a moisture level of 38% was obtained and placed in a feed hopper having walls converging in a feed opening which was situated immediately above the nip of contrarotating roll mills, as illustrated in FIG. 1. The dough sheet formed thereby stuck to one roll mill (the front roll mill) since that roll mill was at a temperature of 60°F higher and was rotating at a 50% faster rate than the other roll mill. As the dough sheet was conveyed along the front roll mill, longitudinal corrugations, or ripples, were impressed in one broad surface of the dough sheet by the use of embossing roll which was annularly grooved. The grooves in the embossing roll were spaced 0.090 inch apart and were machined into the surface to a depth of 0.055 inch, each groove having a width at the roll surface of 0.030 inch and having sides converging at an angle of 20°. The annularly grooved roll had a Teflon coating on its peripheral surface. Prior to having the longitudinal ripples impressed therein, the dough sheet was 0.020 inch thick. The dough sheet, still sticking to the front roll mill, was scraped therefrom by means of a doctor blade and was removed from the vincinity of the front roll mill by means of an endless conveyor belt. Thereafter, the rippled dough sheet was processed in accordance with MacKendrick U.S. Pat. No. 3,520,248 to form unique uniformly shaped chip-type products with both broad surfaces thereof having a distinct rippled configuration.

It may thus be seen that with the present invention, chip-type products having both of their broad surfaces in a rippled configuration may readily be prepared from a formulated coherent workable dough sheet. In addition, these rippled chip-type products may be prepared from such a dough sheet having a rippled configuration impressed in only one broad surface thereof, thus leaving the opposite surface smooth. This then permits the dough sheet to be processed in accordance with conventional processing techniques, especially those particularly adapted for use with a flat dough sheet.

While particular embodiments of the invention have been illustrated and described, it will be apparent to those skilled in the art that various changes and modifications can be made without departing from the spirit and scope of the invention, and it is intended to cover in the appended claims all such changes and modifications that are within the scope of this invention.

We claim:

1. A method of forming chip-type products from a formulated dough material comprising
   a. sheeting said formulated dough material to form a coherent workable dough sheet;
   b. impressing a rippled configuration of substantially parallel arcuate ridges and grooves on only one surface of said dough sheet by passing said dough sheet through the nip of a pair of mill rolls, one of said rolls having a smooth surface and the other of said mill rolls having an annularly grooved surface;
   c. removing said surface-configured dough sheet from said mill rolls.
   d. cutting suitably shaped pieces from said surface-configured dough sheet; and
   e. cooking said dough pieces thereby to provide a crispy chip-type product having a series of distinct and substantially parallel arcuate ridges and grooves extending across both surfaces which effect a rippled appearance to said chip-type product.

2. The method of claim 1 wherein said coherent workable dough sheet if formed by passing said formulated dough material through the nip of contra-rotating mill rolls.

3. The method of claim 2 wherein said coherent workable dough sheet is caused to preferentially adhere to one of said mill rolls.

4. The method of claim 3 wherein said coherent workable dough sheet is caused to preferentially adhere to one of said mill rolls by maintaining the speed of said mill roll to which the coherent workable dough sheet adheres at a speed of from about 5 to about 50 percent faster than the other of said mill rolls.

5. The method of claim 3 wherein said coherent workable dough sheet is caused to preferentially adhere to one of said mill rolls by maintaining the speed of said mill roll to which the coherent workable dough sheet adheres at a speed of from about 10 to about 20 percent faster than the other of said mill rolls.

6. The method of claim 3 wherein said coherent workable dough sheet is caused to preferentially adhere to one of said mill rolls by maintaining the temperature of said mill roll to which the coherent workable dough sheet adheres at a temperature of from about 10° to about 100°F hotter than the other of said mill rolls.

7. The method of claim 3 wherein said coherent workable dough sheet is caused to preferentially adhere to one of said mill rolls by maintaining the temperature of said mill roll to which the coherent workable dough sheet adheres at a temperature of from about 50° to about 65°F hotter than the other said mill rolls.

8. The method of claim 2 wherein said formulated dough material comprises a mixture of dehydrated potatoes and water.

9. The method of claim 2 wherein said coherent workable dough sheet is from about 0.005 inch to about 0.1 inch in thickness.

10. The method of claim 9 wherein said coherent workable dough sheet is from about 0.01 inch to about 0.03 inch in thickness.

11. The method of claim 1 wherein said surface-configured dough sheet is caused to preferentially adhere to said roll mill having a smooth surface.

12. The method of claim 11 wherein said surface-configured dough sheet is caused to preferentially adhere to said mill roll having a smooth surface by coating said annularly grooved mill roll with a non-stick coating.

13. The method of claim 11 wherein said removing is performed by scraping said mill roll having a smooth surface with a doctor blade.

14. The method of claim 13 wherein said surface-configured dough sheet is removed from said mill roll having its surface-configured surface downward and its substantially smooth surface upward.

15. The method of claim 1 wherein said coherent workable dough sheet is formed by passing said formulated dough material through the nip of a pair of contra-rotating mill rolls and is caused to preferentially adhere to one of said mill rolls and wherein said substantially parallel arcuate ridges and grooves are impressed on one surface of said sheet by contacting a third roll with said preferentially adhered dough sheet, said third roll having an annularly grooved surface.

* * * * *

UNITED STATES PATENT AND TRADEMARK OFFICE
CERTIFICATE OF CORRECTION

PATENT NO. : 3,956,517
DATED : May 11, 1976
INVENTOR(S) : Alan Dale Curry, Leon Levine, and Dennis William Rose It is certified that error appears in the above-identified patent and that said Letters Patent are hereby corrected as shown below:

| | |
|---|---|
| Col. 1, line 36 | "Produt" should be -- Products -- |
| Col. 1, line 38 | "Produts" should be -- Products -- |
| Col. 1, line 41 | "Produts" should be -- Products -- |
| Col. 4, line 25 | "diferential" should be -- differential -- |
| Col. 4, line 59 | after "surface", insert -- of -- |
| Col. 6, line 24 | "3.5:1" should be -- 5:1 -- |
| Col. 6, line 66 | after "of" insert -- a -- |
| Col. 7, line 58 | after "of" insert -- an -- |
| Col. 8, line 1 | "vincinity" should be -- vicinity -- |
| Col. 8, line 48 | "if" should be -- is -- |
| Col. 9, line 10 | after "other" insert -- of -- |

Signed and Sealed this

Twelfth Day of October 1976

[SEAL]

Attest:

RUTH C. MASON
*Attesting Officer*

C. MARSHALL DANN
*Commissioner of Patents and Trademarks*